US011283923B1

(12) United States Patent
Messerges et al.

(10) Patent No.: US 11,283,923 B1
(45) Date of Patent: Mar. 22, 2022

(54) METHOD AND APPARATUS FOR HANDLING CITIZEN CALLBACK OF PUBLIC-SAFETY OFFICER

(71) Applicant: MOTOROLA SOLUTIONS, INC., Chicago, IL (US)

(72) Inventors: Thomas S Messerges, Schaumburg, IL (US); Janet A Manzanares, Broomfield, CO (US); Steven D Tine, Cheshire, CT (US); David Johnson, Snohomish, WA (US); Jon Milan, Redmond, WA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/207,799

(22) Filed: Mar. 22, 2021

(51) Int. Cl.
*H04M 3/51* (2006.01)
*H04M 3/533* (2006.01)
*H04W 4/90* (2018.01)
*H04W 76/50* (2018.01)

(52) U.S. Cl.
CPC ....... *H04M 3/5116* (2013.01); *H04M 3/5335* (2013.01); *H04W 4/90* (2018.02); *H04W 76/50* (2018.02); *H04M 2242/04* (2013.01)

(58) Field of Classification Search
USPC ........................................................ 379/37
See application file for complete search history.

(56) References Cited

U.S. PATENT DOCUMENTS

| 9,237,243 | B2 | 1/2016 | Jensen et al. | |
|---|---|---|---|---|
| 10,242,554 | B2 | 3/2019 | Dizengof et al. | |
| 10,362,168 | B1* | 7/2019 | Pitta Eswara Chandra | H04M 3/5166 |
| 2007/0072593 | A1 | 3/2007 | Math | |
| 2008/0102783 | A1 | 5/2008 | Bustamante | |
| 2014/0368601 | A1* | 12/2014 | deCharms | H04L 67/26 348/14.02 |
| 2015/0085997 | A1* | 3/2015 | Biage | H04W 4/02 379/45 |
| 2015/0244872 | A1* | 8/2015 | Hoover | H04M 11/04 379/45 |
| 2016/0173689 | A1* | 6/2016 | Klaban | G08B 25/016 455/404.1 |
| 2017/0251347 | A1* | 8/2017 | Mehta | H04W 4/90 |
| 2018/0053401 | A1* | 2/2018 | Martin | H04L 12/1895 |

(Continued)

FOREIGN PATENT DOCUMENTS

KR 20070041119 A 4/2007

*Primary Examiner* — Maria El-Zoobi (57) ABSTRACT

In order to address the above-mentioned need, a method for routing civilian calls to an associated public-safety officer is provided herein. During operation, a call processor receives a civilian call having a source identifier number identifying a source of the call and a target identifier number identifying a target of the call. A current status priority of the associated public-safety officer is determined as a function of the current assignment status, and when the current status priority is less than the incident record priority, the civilian call is routed directly to a mobile device associated with the associated public-safety officer. When the current status priority is greater than the incident record priority, the civilian call is routed directly to one of a public-safety answering point or an automated voice mail system.

11 Claims, 3 Drawing Sheets

(56) References Cited

U.S. PATENT DOCUMENTS

| | | | |
|---|---|---|---|
| 2019/0149661 A1* | 5/2019 | Klaban | H04W 4/02 |
| | | | 379/45 |
| 2020/0045179 A1* | 2/2020 | Firpo | H04M 3/436 |
| 2020/0286353 A1* | 9/2020 | Jafri | G08B 27/001 |

* cited by examiner

METHOD AND APPARATUS FOR HANDLING CITIZEN CALLBACK OF PUBLIC-SAFETY OFFICER

BACKGROUND OF THE INVENTION

Best policing practices operate under the assumption that community safety must be a joint venture of police and citizens. This joint venture (sometimes referred to as community policing) establishes better public relations and throttles back public skepticism of police. With community policing, citizen engagement is fostered when public-safety officers are readily available. With the above in mind, public-safety agencies want improved interactions with citizens via community policing, however limitations to these communications are needed so as not to completely disrupt police officers from performing their daily responsibilities.

Some communities give citizens the ability to "callback" officers to receive and provide updates regarding incidents. While these callbacks are encouraged to foster better communications, they can be disruptive to an officer's daily responsibilities. A solution is needed to allow citizen callbacks while avoiding officer disruptions.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions or steps may be described or depicted in a particular order of occurrence while those skilled in the art will understand that such specificity with respect to sequence is not actually required.

DETAILED DESCRIPTION

In order to address the above-mentioned need, a method for routing civilian calls to a public-safety officer is provided herein. During operation, a call processor receives a civilian call having a source identifier number identifying a source of the call and a target identifier number identifying a target of the call. A public-safety incident database is accessed and using one of the source identifier number, the target identifier number, and an incident record is identified that is most highly correlated with the source identifier number and/or the target identifier number. An incident record priority associated with the incident record within the public-safety incident database is determined, wherein the incident record priority is based on a type of incident identified in the incident record, or an incident type to priority mapping.

A public-safety officer is determined that is the target of the call and a public-safety officer status database is accessed to determine a current status of the public-safety officer. A current status priority of the associated public-safety officer is determined as a function of the current status, and when the current status priority is less than the incident record priority, the civilian call is routed directly to a mobile device associated with the public-safety officer. When the current status priority is greater than the incident record priority, the civilian call is routed directly to one of a public-safety answering point or an automated voice mail system.

As an example of the above, consider a situation where a student's bicycle is stolen. Officer John works with the victim to file a police report and provides his phone number in case the victim has any future questions. Two days pass and the victim needs a copy of the police report for insurance purposes. The victim calls Officer John to find out whether anyone has found the bike and to ask for the report. Since the incident record priority for this event is likely to be low, Officer John will not be interrupted when assigned to most tasks since the current status priority of those tasks is likely lower than the incident record priority.

Consider another example where a spousal abuse victim has called police on numerous occasions. Officer Jane typically handles her case and has developed a strong relationship with the victim. Officer Jane provides the victim with her callback number and instructs her to call if she needs further advice. The incident record priority for this incident will be high, allowing the victim's call to interrupt the officer when she is engaged in many lower priority tasks (i.e., many tasks assigned to Officer Jane will have a lower current status priority than the incident record priority).

In order to better explain operation of handling a citizen callback of an officer, the following definitions are provided:

Incident Record—A digital accounting of a past public-safety incident. The digital accounting includes information such as, but not limited to a type of incident, identification of parties involved in the incident, identification of public-safety officers involved in the incident, and a time and place of the incident. The incident record may be generated automatically, or generated by a public-safety dispatch operator typing in information into an incident form to generate the incident record.

Incident Record Priority—Typically a number between 1 and 10 that is assigned to an incident record and indicates a priority level for the incident record. In one embodiment, the higher the assigned number, the higher the priority of the incident record. The incident record priority may be based on many factors, including, but not limited to a severity of an incident identified in the incident record, a number of attempts made to contact an officer identified in the incident record, a time since last contact (i.e., called 10 seconds ago) identified in the incident record, a time since the incident occurred identified in the incident record, a severity of a crime identified in the incident record, a value of property involved identified in the incident record, an officer-assigned priority identified in the incident record, a case history identified in the incident record, callback history trends identified in the incident record, external factors such as community unrest identified in the incident record, or a caller provided priority identified in the incident record or determined from caller input based on responses obtained from pre-screening questions presented to the caller, for example from an automated answering system.

Public-Safety Incident Database—A database of incident records and their associated incident record priorities.

Public-Safety Officer Status—the current position of affairs of a public safety officer, such as, but not limited to, currently assigned to a robbery, currently assigned to a burglary, currently off duty, currently on a lunch break, . . . , etc.

Current Status priority—Typically a number between 1 and 10 that is assigned to a public-safety officer's current situation, and indicates a priority level for the public-safety officer status. In one embodiment, the higher the assigned number, the higher the priority of the public-safety officer status. The current status priority may be based on an officer's assigned computer-aided dispatch ID (CAD ID) identified in the incident record, a priority of the CAD incident the officer is currently responding to, a classification of incident (investigate/"patrol when possible"), or an Officer manually provided priority. It should be noted that a CAD ID can be utilized to determine a current incident assigned to the officer. A CAD ID is generated for incidents where an officer is dispatched/assigned, or where an officer encounters a public-safety event. This ID (to which the officer is assigned) could be something as simple as a number associated with a particular incident, or something as complicated as an identification that is a function of populated fields (e.g., time, location, incident type, . . . , etc.), one of which may comprise an incident type. Incident type is a descriptor of the nature of the event. Incident type may be as simple as "Law", "Police", "Fire", or "EMS", but can be as specific as "Multiple car accident with rollover, injuries, and entrapment" or "Structure fire, multi-level, flammables on scene". Every Incident is assigned both an ID and a type. This assignment of a CAD ID to an officer is usually accomplished by a public-safety dispatch operator making the assignment manually, but in alternate embodiments of the present invention, may be done automatically.

Public-Safety Officer Status Database—A database comprising public-safety officer statuses along with the current status priority for the public-safety officer's current status.

Figure 1:
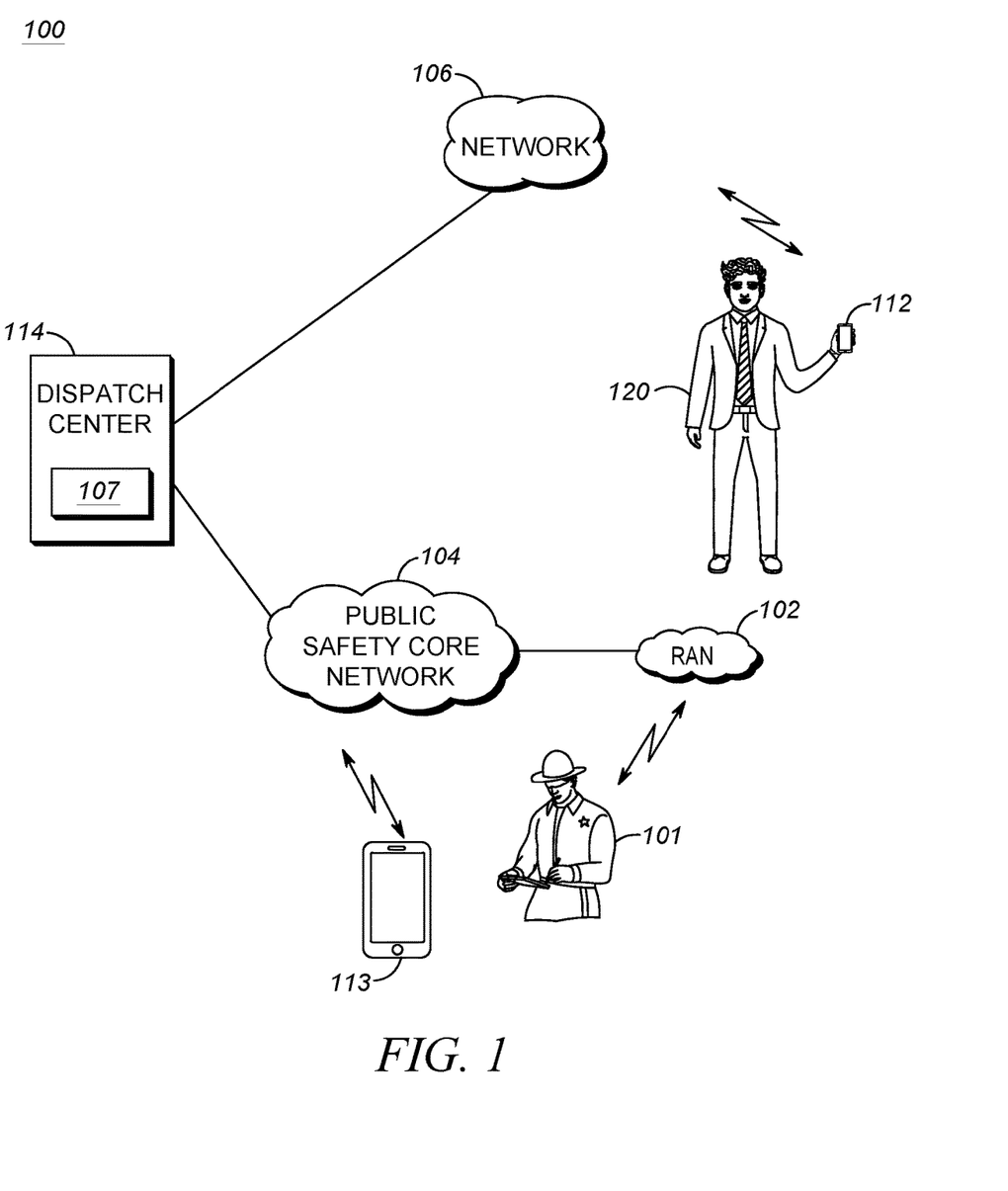
FIG. 1 illustrates an operating environment for the present invention.

FIG. 1 illustrates a system for implementing the present invention. System 100 includes one or more radio access networks (RANs) 102, a public-safety core network 104, smart devices 112 and 113, network 106, call processor 107, and emergency dispatch center 114 serving as a PSAP.

As shown in FIG. 1, several separate networks exist, namely public-safety core network 104, and public network 106 (e.g., Verizon, Spring, AT&T, . . . , etc.). Network 106 may be wired or wireless, and comprises a standard network configured to facilitate a standard telephone call between any device 112 and dispatch center 114.

Each RAN 102 includes typical RAN elements such as base stations, base station controllers (BSCs), routers, switches, and the like, arranged, connected, and programmed to provide wireless service (such as a telephone call) to user equipment (e.g., tablet computer operated by officer 101 or smart device 113 operated by officer 101) in a manner known to those of skill in the relevant art.

In a similar manner, network 106 includes elements (which may be shared) such as base stations, base station controllers (BSCs), routers, switches, and the like, arranged, connected, and programmed to provide data and call services to user equipment 112 and/or 113 (e.g., smart phone or computers 112 and 113 operated by user 120 and officer 101) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications to/from officer 101.

Smart devices 112 and 113 may be any suitable computing and communication devices configured to engage in wired or wireless communication over network 106 and/or network 104. Such communication may comprise standard cellular data. For example, smart devices 112 and 113 may comprise a mobile device running an Android™ or iOS™ operating system.

Dispatch center 114 is part of a computer-aided-dispatch center, preferably manned by an operator and configured to receive E-911 calls and/or standard telephone calls from devices 112 and 113. For non-public-safety personnel, calls are typically routed from device 112 through network 106. However, for public-safety personnel, either network 104 or 106 may be utilized by device 113 for routing calls. Calls received from device 112 at dispatch center 114 may be provided/forwarded to officer 101 (via core network 104 or network 106). For example, network 106 may receive a call from user 120 destined to officer 101 (smart device 113). Network 106 will route this call to dispatch center 114. The call may be further routed by call processor 107 to device 113 utilizing either network 104 or network 106.

Finally, call processor 107 is provided. Although processor 107 is shown existing within dispatch center 114, in alternate embodiments, processor 107 may be located outside of dispatch center 114. When located outside of dispatch center 114, processor 107 is connected to dispatch center 114 through an intervening network (e.g., networks 104 or 106). Processor 107 is configured to receive a call from device 112 destined to device 113. Processor 107 then determines an incident priority associated with the call. Processor 107 then determines a current status priority for officer 101. The call is forwarded to device 113 (device 113 is associated with officer 101) only if the incident priority is greater than the current status priority.

Figure 2:
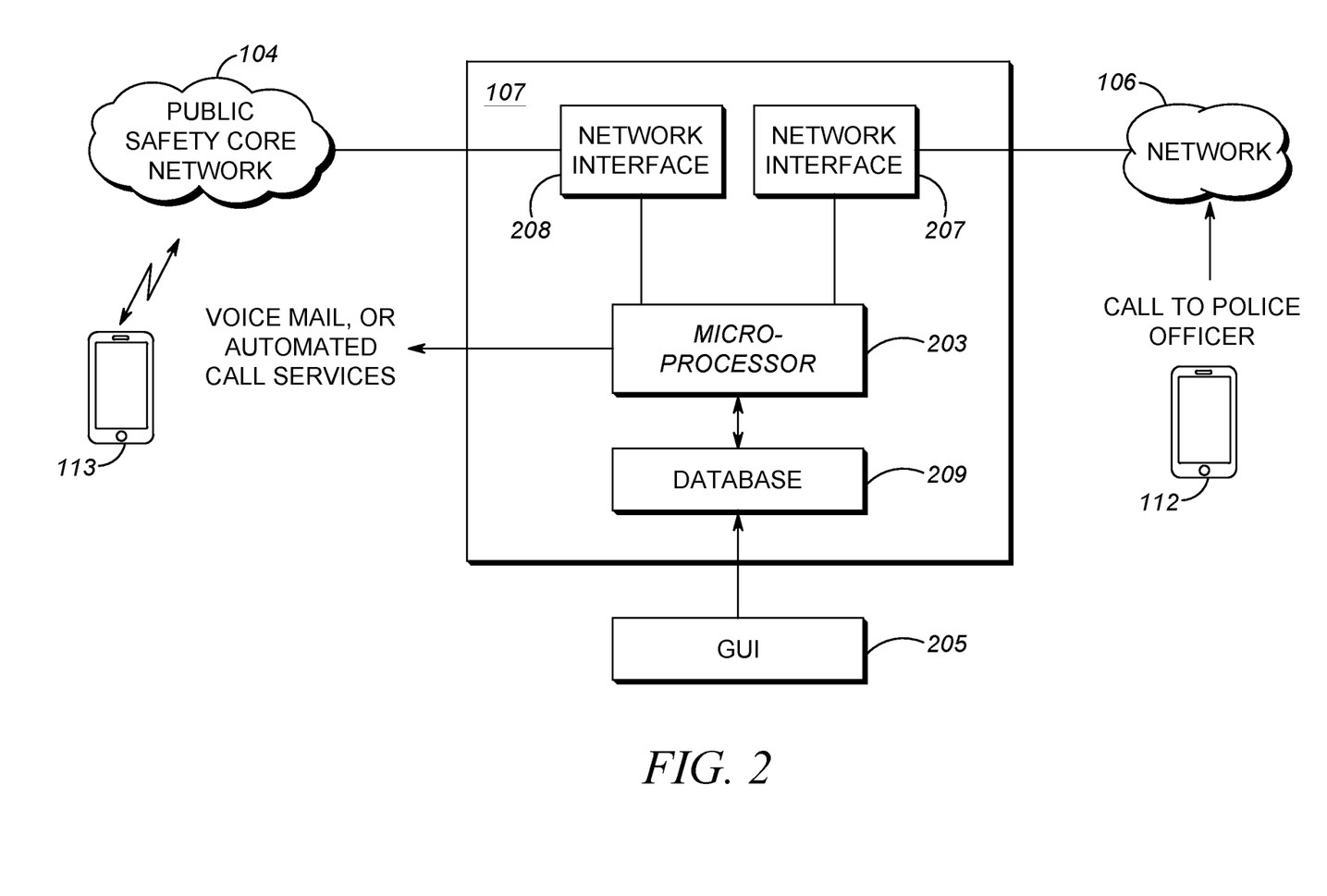
FIG. 2 shows a more-detailed block-diagram of call processor 107.

FIG. 2 shows a more-detailed block-diagram of call processor 107. Call processor 107 preferably includes network interfaces 207 and 208, database 209, and logic circuitry 203. In other implementations, call processor 107 may include more, fewer, or different components.

Graphical user Interface (GUI) 205 serves as an interface to database 209 and is utilized to input data into database 209. In order to accomplish this, GUI 205 preferably comprises a screen (e.g., a liquid crystal display (LCD), organic light-emitting diode (OLED) display, surface-conduction electron-emitter display (SED), plasma display, field emission display (FED), bistable display, projection display, laser projection, holographic display, etc.) that can display data being inserted or retrieved from database 209. In order to provide the above features (and additional features), GUI 205 may include a monitor, a keyboard, a mouse, and/or various other hardware components to provide a man/machine interface. The GUI is preferably operated by a public-safety dispatch operator, and is used to enter data into database 209.

Logic circuitry 203 comprises a digital signal processor (DSP), general purpose microprocessor, a programmable logic device, or application specific integrated circuit (ASIC) and is configured to determine whether or not to forward calls from civilians to officers. More specifically, logic circuitry 203 is configured to receive an incoming call from a civilian and determine the identity of the calling-party, the identity of the called-party, and whether the current status priority for the called party is greater than the incident record priority associated with the calling party.

In an illustrative embodiment, networks 104 and 106 are attached (i.e., connected) to call processor 107 through network interfaces 207 and 208, and communicate with processor 203. Networks 104 and 106 are connected via a wired connection to network interfaces 207 and 208, although this connection may be wireless in alternative embodiments. Network interfaces 207 and 208 includes elements including processing, modulating, and transceiver elements that are operable in accordance with any one or more standard or proprietary wired or wireless interfaces, wherein some of the functionality of the processing, modulating, and transceiver elements may be performed by means of processor 203.

Database 209 is provided. Database 209 comprises standard memory (such as RAM, ROM, . . . , etc) and functions as a public-safety incident database and public-safety officer status database. More specifically, database 209 is configured to store incident records and their associated incident record priorities. Database 209 is also configured to store public-safety officer statuses along with the current status priority for the public-safety officer's current status. Database 209 is preferably populated in real time with information about incidents reported to dispatch center 114. As such, database 209 will be coupled to a PSAP through GUI 205 so that the data may be populated.

During operation, network interface 207 receives a civilian call from device 112 having a source identifier number identifying a source of the call and a target identifier number identifying a target of the call. The call is passed to logic circuitry 203.

Logic circuitry 203 receives the call from network interface 207 and accesses public-safety incident database 209 and uses one of the source identifier number or the target identifier number to identify an incident record most highly correlated with the source identifier number or the target identifier number. Logic circuitry 203 then accesses public-safety incident database 209 to identify an incident record most highly correlated with the source identifier number or the target identifier number and determines an incident record priority associated with the incident record within public-safety incident database 209. More particularly, each incident record comprises telephone numbers and identities of individuals that were part of the incident along with the telephone number of the officer assigned to the incident. These telephone numbers are utilized to determine an incident record most-likely related to the called and the calling parties.

It should be noted that the incident record priority may simply be stored in database 209, and associated with the incident record, or may be determined by mapping the type of incident found in the incident record to a particular priority. The mapping process preferably comprises an operation that associates each element of a given set (the domain) with one or more elements of a second set (the range). The incident type comprises the domain, while incident record priority comprises the range. The mapping may be explicit based on predefined rules, or the mapping may be trained via neural network modeling. More specifically, it can be said that that f "takes the value" or "maps to" f(x) at x. The set of all possible x is called the domain of the function f. The set of possible outcomes of f(x) is called the range. The range preferably comprises an incident record priority. Thus, the mapping process preferably comprises an operation that associates each element of a given set (the domain) with one or more elements of a second set (the range). Thus:

incident record priority=Function(incident type).

It should be noted that other variables may be used to determine an incident record priority. For example, a number of times that a user attempts to call an officer may also be used as a variable to determine an incident record priority such that:

incident record priority=Function(incident type,number of calls to officer by the current calling party).

Thus, the incident record may comprise a call history record that recites historical calls made between public-safety officers and civilians, and wherein identifying the incident record most highly correlated with the one of the source identifier number or the target identifier number comprises identifying the incident record having the call history record indicating a recent call from the associated public-safety officer to the mobile device associated with the source identifier number.

Logic circuitry 203 identifies an associated public-safety officer that is the target of the call, wherein the step of identifying is based on one of the source identifier number or the target identifier number. Public-safety officer status database 209 is accessed by logic circuitry and a current status of the associated public-safety officer is determined from the public-safety officer status database. Logic circuitry 203 then determines a current status priority of the associated public-safety officer as a function of the current status. The current status priority may be stored in database 209 and associated with the public-safety officer's status, or alternatively, may be determined by logic circuitry 203 via a mapping process as described above such that:

Current status priority=$F$(current status).

When the current status priority is less than the incident record priority, the call is routed by logic circuitry 203 directly to mobile device 113 associated with the associated public-safety officer. This may take place by routing the call through network interface 208 through network 104, or alternatively through network interface 207 through network 106. Finally, when the current status priority is greater than the incident record priority, logic circuitry 203 routes the call directly to voice mail or automated call services by directing the call to one of a public-safety answering point and an automated voice mail system. Logic circuitry 203 may adjust the incident record priority higher based on a number of attempted calls from the source identifier number.

Figure 3:
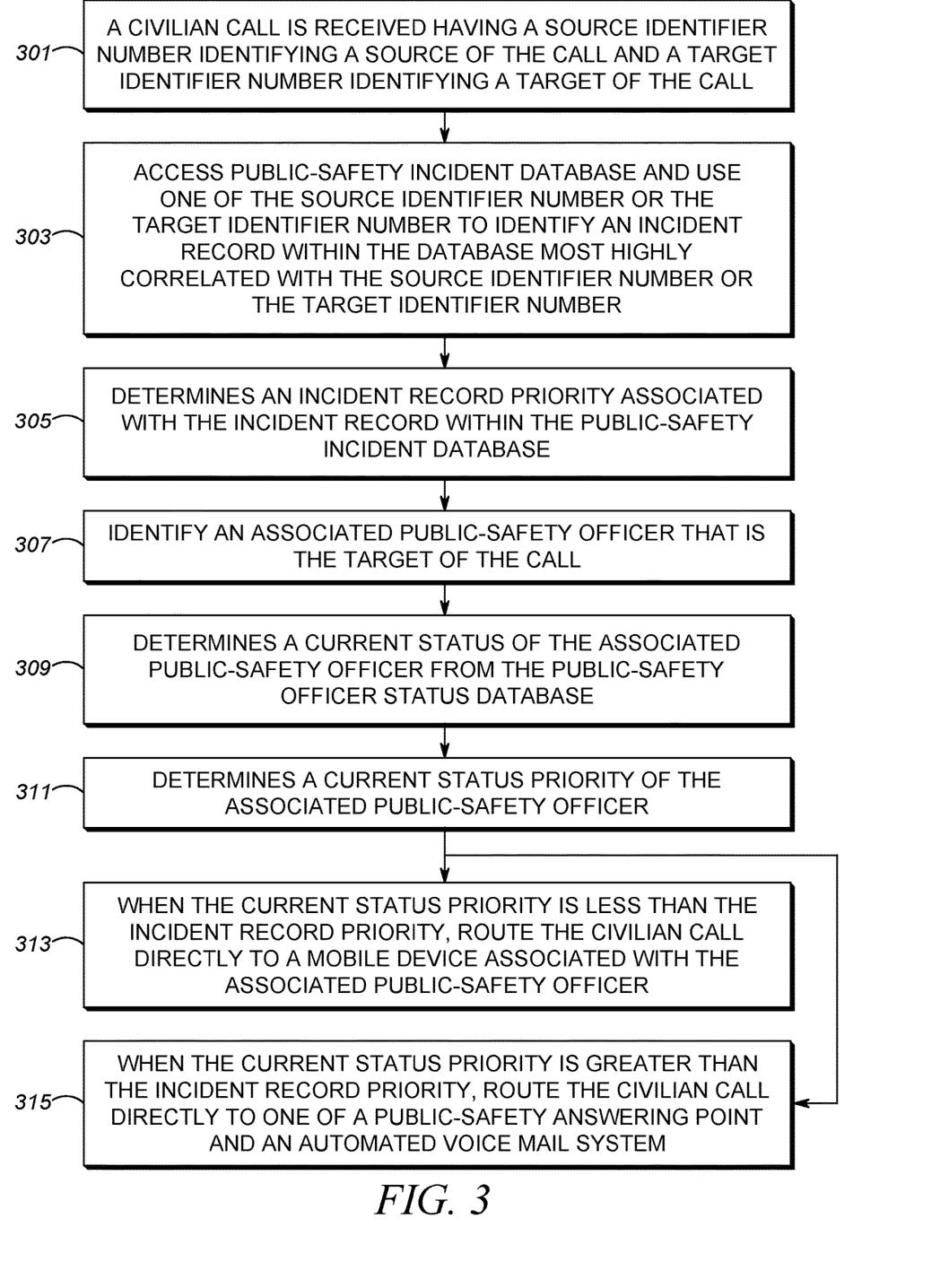
FIG. 3 is a flow chart showing operation of the call processor of FIG. 2.

Considering the above discussion, FIG. 3 shows an apparatus comprising a network interface configured to receive a civilian call having a source identifier number identifying a source of the call and a target identifier number identifying a target of the call, a public-safety incident database, a public-safety officer status database, and logic circuitry configured to determine an incident record priority associated with the incident record within the public-safety incident database, wherein the incident record priority is based on a type of incident identified in the incident record, or an incident type to priority mapping, identify an associated public-safety officer that is the target of the call, wherein the step of identifying is based on one of the source identifier number, the target identifier number, access a public-safety officer status database and determine a current status of the associated public-safety officer from the public-safety officer status database, determine a current status priority of the associated public-safety officer as a function of the current status and route the civilian call directly to a mobile device associated with the associated public-safety officer when the current status priority is less than the incident record priority, or route the civilian call directly to one of a public-safety answering point and an automated voice mail system when the current status priority is greater than the incident record priority.

As discussed, the incident record may comprise a call history record that recites historical calls made between public-safety officers and civilians, and wherein identifying the incident record most highly correlated with the one of the source identifier number or the target identifier number comprises identifying the incident record having the call history record indicating a threshold recent call from the associated public-safety officer to the mobile device associated with the source identifier number.

Additionally, the logic circuitry may be further configured to adjust the incident record priority higher based on a number of attempted calls from the source identifier number.

Finally, the logic circuitry may be configured to determine the current status priority by mapping the current status to the current status priority.

FIG. 3 is a flow chart showing the operation of call processor 107. The logic flow begins at step 301 where a civilian call is received at network interface 207 having a source identifier number identifying a source of the call and a target identifier number identifying a target of the call. At step 303 logic circuitry 203 accesses public-safety incident database 209 and uses one of the source identifier number or the target identifier number to identify an incident record within the database most highly correlated with the source identifier number or the target identifier number. The logic flow continues on to step 305 where logic circuitry 203 determines an incident record priority associated with the incident record within the public-safety incident database, wherein the incident record priority is based on a type of incident identified in the incident record, or an incident type to priority mapping. At step 307, logic circuitry 203 identifies an associated public-safety officer that is the target of the call, wherein the step of identifying is based on one of the source identifier number, the target identifier number. The logic flow continues to step 309 where public-safety officer status database 209 is accessed by logic circuitry 203, and logic circuitry 203 determines a current status of the associated public-safety officer from the public-safety officer status database. Logic circuitry 203 then determines a current status priority of the associated public-safety officer as a function of the current status (step 311) and when the current status priority is less than the incident record priority, routes, the civilian call directly to a mobile device associated with the associated public-safety officer (step 313), and when the current status priority is greater than the incident record priority, routes the civilian call directly to one of a public-safety answering point or an automated voice mail system (step 315).

As discussed above, the incident record may comprise a call history record that recites historical calls made between public-safety officers and civilians, and wherein identifying the incident record most highly correlated with the one of the source identifier number or the target identifier number comprises identifying the incident record having the call history record indicating a threshold number of recent calls from the associated public-safety officer to the mobile device associated with the source identifier number.

As discussed above, the incident record priority may be adjusted higher based on a number of attempted calls from the source identifier number.

Finally, the step of determining the current status priority may comprise the step of mapping the current status to the current status priority.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for routing civilian calls to an associated public-safety officer, the method comprising:
   receiving a civilian call having a source identifier number identifying a source of the call and a target identifier number identifying a target of the call;
   accessing a public-safety incident database and using one of the source identifier number or the target identifier number to identify an incident record most highly correlated with the source identifier number or the target identifier number;
   determining an incident record priority associated with the incident record within the public-safety incident database, wherein the incident record priority is based on a type of incident identified in the incident record, or an incident type to priority mapping;
   identifying an associated public-safety officer that is the target of the call, wherein the step of identifying is based on one of the source identifier number, the target identifier number;
   accessing a public-safety officer status database and determining a current status of the associated public-safety officer from the public-safety officer status database;
   determining a current status priority of the associated public-safety officer as a function of the current status;
   when the current status priority is less than the incident record priority, routing the civilian call directly to a mobile device associated with the associated public-safety officer; and
   when the current status priority is greater than the incident record priority, routing the civilian call directly to one of a public-safety answering point or an automated voice mail system.

2. The method of claim 1, wherein the incident record comprises a call history record that recites historical calls made between public-safety officers and civilians, and wherein identifying the incident record most highly correlated with the one of the source identifier number or the target identifier number comprises identifying the incident record having the call history record indicating a threshold recent call from the associated public-safety officer to the mobile device associated with the source identifier number.

3. The method of claim 1, further comprising adjusting the incident record priority higher based on a number of attempted calls from the source identifier number.

4. The method of claim 1, wherein the step of determining the current status priority comprises the step of mapping the current status to the current status priority.

5. The method of claim 1 wherein the incident record priority is further based on a number of attempts made to contact the officer, a time since last contact of the officer, a time since the incident occurred, a severity of a crime, a value of property involved in the incident, an officer-assigned priority, a case history, or a caller provided priority.

6. The method of claim 1 wherein the step of determining the current status priority comprises determining the status priority based an officer's assigned computer-aided dispatch ID (CAD ID), a priority of a CAD incident the officer is currently responding to, or an Officer manually provided priority.

7. An apparatus comprising:
   a network interface configured to receive a civilian call having a source identifier number identifying a source of the call and a target identifier number identifying a target of the call;
   a public-safety incident database;
   a public-safety officer status database; and
   logic circuitry configured to
      determine an incident record priority associated with the incident record within the public-safety incident database, wherein the incident record priority is based on a type of incident identified in the incident record, or an incident type to priority mapping;
      identify an associated public-safety officer that is the target of the call, wherein the step of identifying is based on one of the source identifier number, the target identifier number;
      access a public-safety officer status database and determine a current status of the associated public-safety officer from the public-safety officer status database;
      determine a current status priority of the associated public-safety officer as a function of the current status;
      route the civilian call directly to a mobile device associated with the associated public-safety officer when the current status priority is less than the incident record priority; and route the civilian call directly to one of a public-safety answering point or an automated voice mail system when the current status priority is greater than the incident record priority.

8. The apparatus of claim 7, wherein the incident record comprises a call history record that recites historical calls made between public-safety officers and civilians, and wherein identifying the incident record most highly correlated with the one of the source identifier number or the target identifier number comprises identifying the incident record having the call history record indicating a threshold recent call from the associated public-safety officer to the mobile device associated with the source identifier number.

9. The apparatus of claim 7, wherein the logic circuitry is further configured to adjust the incident record priority higher based on a number of attempted calls from the source identifier number.

10. The apparatus of claim 7, wherein the logic circuitry is configured to determine the current status priority by mapping the current status to the current status priority.

11. A method for routing civilian calls to an associated public-safety officer, the method comprising:
  receiving a civilian call having a source identifier number identifying a source of the call and a target identifier number identifying a target of the call;
  accessing a public-safety incident database and using one of the source identifier number or the target identifier number to identify an incident record most highly correlated with the source identifier number or the target identifier number;
  determining an incident record priority associated with the incident record within the public-safety incident database, wherein the incident record priority is based on a type of incident identified in the incident record, or an incident type to priority mapping;
  identifying an associated public-safety officer that is the target of the call, wherein the step of identifying is based on one of the source identifier number, the target identifier number;
  accessing a public-safety officer status database and determining a current status of the associated public-safety officer from the public-safety officer status database;
  determining a current status priority of the associated public-safety officer as a function of the current status;
  when the current status priority is less than the incident record priority, routing the civilian call directly to a mobile device associated with the associated public-safety officer; and
  when the current status priority is greater than the incident record priority, routing the civilian call directly to one of a public-safety answering point or an automated voice mail system;
  wherein the incident record comprises a call history record that recites historical calls made between public-safety officers and civilians, and wherein identifying the incident record most highly correlated with the one of the source identifier number or the target identifier number comprises identifying the incident record having the call history record indicating a threshold recent call from the associated public-safety officer to the mobile device associated with the source identifier number;
  further comprising adjusting the incident record priority higher based on a number of attempted calls from the source identifier number;
  wherein the step of determining the current status priority comprises the step of mapping the current status to the current status priority.

* * * * *